July 17, 1951  R. E. MILLER  2,560,587
RANGE AND DIRECTION FINDER
Filed Oct. 31, 1945  2 Sheets-Sheet 1

Inventor
ROBERT E. MILLER

July 17, 1951 R. E. MILLER 2,560,587
RANGE AND DIRECTION FINDER

Filed Oct. 31, 1945 2 Sheets—Sheet 2

Inventor
ROBERT E. MILLER

By Ralph L Chappell
Attorney

Patented July 17, 1951

2,560,587

UNITED STATES PATENT OFFICE 2,560,587

RANGE AND DIRECTION FINDER

Robert E. Miller, United States Navy

Application October 31, 1945, Serial No. 625,927

7 Claims. (Cl. 177—352)

(Granted under the act of March 3, 1883, as amended April 30, 1928; 370 O. G. 757)

This invention relates to a range and direction finder, which operates through the medium of supersonic waves.

It is frequently necessary to locate nearby objects which may not be visible due to fog, darkness, blindness, or other reasons; and this invention provides a relatively simple, compact, and inexpensive device for this purpose. On shipboard it is useful for locating the direction and range of such objects for the purpose of maintaining convoy position, determining the position of marker buoys, navigating in restricted waters, etc. This invention may be small and compact in size and may be carried by the person using it. Thus it is also useful for a blind person, as an aid in locating vehicles and other objects, and to establish their distance from him.

One object of the invention is to provide a compact and inexpensive device for range and direction finding.

Another object is to provide a range and direction indicator which does not require a visual indicator or visual interpretation of results.

A further object is to provide a means for the blind to effectively locate objects and determine their shape, direction, and distance.

A still further object is to provide a measuring tool for use by surveyors to enable the accurate determination of the bearing and range of objects.

Other objects and advantages will be apparent from the following specification in conjunction with the appended claims.

Ranging systems are known in which high frequency waves are used for locating the direction and distance of objects. In the system of this invention supersonic waves are used for this purpose. These waves are emitted from a directional source in the form of short pulses of energy which are reflected from a target. The time of travel from the source to the target and back to a receiver is accurately measured on a variable scale suitably calibrated in linear distance by the use of an aural indicator. In the preferred embodiment frequencies of the order of 20 kilocycles are employed, but the invention is not limited to this value since much higher, or lower, values may be used.

A system of multivibrators, gating circuits and band pass filters are arranged to provide a simple yet effective means for short distance range and direction finding. A method of measuring time differences is incorporated which simplifies the device and the interpretation of results produced. The measuring scale provided for the device may be calibrated with raised symbols similar to Braille enabling the operator to read the range by touch.

In a simplified version also described herein this measuring facility is eliminated for reasons of simplicity, reduced size and lowered production costs. In using the device under these circumstances aural perception of the time difference between initiating and reflected pulses would be accomplished by training of the operators. This latter simplification is in no way intended to be restrictive. The term "nearby objects" in this specification is used to designate distances as measured in the preferred embodiment up to 1000 feet, although this is not to be considered restrictive, and the device may be used at greater distances.

The invention may be more easily understood by the following description in connection with the accompanying drawings in which.

Figure 1:
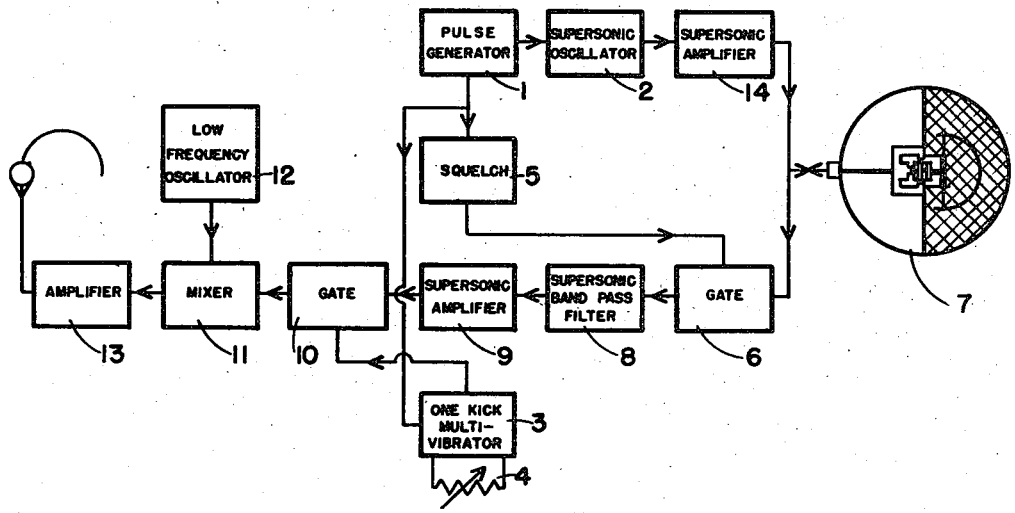
Figure 1 is a block diagram of the invention.

The operation will be better understood by referring to Figure 1, which is a block diagram of transmitting and receiving equipment. A pulse generator 1 produces for example, one millisecond pulses at the rate of two per second. This D. C. voltage momentarily removes the cut-off bias from a supersonic oscillator 2 causing high frequency oscillations to result. The output of this oscillator is amplified at 14 and used to excite a transducer 7 in a directional mounting, such as a rotational parabola.

At the same instant the exciting pulse is generated, an initiating action begins in a one shot multivibrator 3. This multivibrator has an "on time" equal to one millisecond and its output pulse location with respect to the operating cycle of the pulse generator is accurately controllable between, for example, 0 and 500 milliseconds. The action of the pulse generator 1 similarly operates a squelch circuit 5 which closes a gate 6 between the transducer 7 and a band pass filter 8, preventing overload due to the initiating pulse.

Supersonic energy from the target arriving at the transducer after the completion of each pulse of the initiating generator is allowed to pass through the gate 6 to the supersonic band pass filter 8. This filter prevents extraneous and unwanted sounds from being amplified in an amplifier 9 and a reaching gate 10. The reflected pulse upon reaching gate 10 is passed only when a control 4 is adjusted so that the pulse generated by the one shot multivibrator 3 occurs at the instant of the arrival of the reflected wave. The time of the generation of the measuring pulse is calibrated in linear distance indicating the target range.

The output of gate 10 is passed to a mixer 11 along with low-frequency oscillations from an oscillator 12, reducing the supersonic pulse to audio frequencies, which are amplified by an amplifier 13. At all the times that the operator obtains tone output the reading of the range indicator provides the distance to the target and the heading of the transducer indicates its direction.

The range indicator control is logarithmic providing more precise readings for short ranges than long, where the greatest accuracy is needed. This further accomplishes the purpose of minimizing small errors in the critical range values which might occur due to variations in the velocity of waves affected by changes in barometric pressure and moisture content of air.

Figure 2:
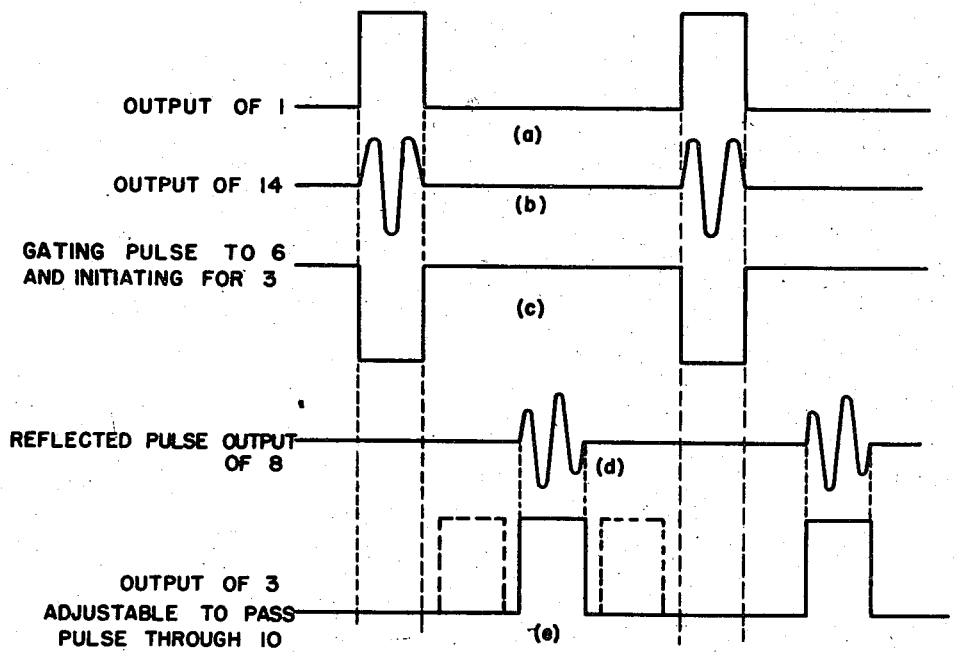
Figure 2 shows the timing of the pulses in the system.

The sequential operations of the various units comprising this device are shown diagrammatically on an amplitude versus time basis in Figure 2 (a) to (e). The output of pulse generator 1, shown in Figure 2, produces a D. C. voltage which momentarily permits oscillations to occur in supersonic oscillator 2. This results in a train of short duration alternating potentials as shown in Figure 2 (b) which are applied to and transmitted by the transducer.

The cut-off pulse for the receiving gate 6 and the initiating pulse controlling the operating cycle of the measuring gate 3 is shown in Figure 2 (c).

The reflected energy received by the transducer and passed by receiving gate 6 and band pass filter 8 is shown in Figure 2 (d). The adjustable nature and correct position (for the illustrated case) of the measuring pulse produced by gating multivibrator 3 is shown in Figure 2 (e).

Figure 3:
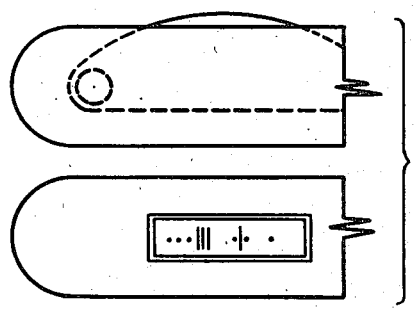
Figure 3 shows the outward appearance of one type of range indicator.

In using the device as an air for the blind, a range potentiometer similar to that shown in Figure 3 would be used. Symbols similar to Braille are provided on a moveable scale, thus enabling the blind to read the range.

Figure 4:
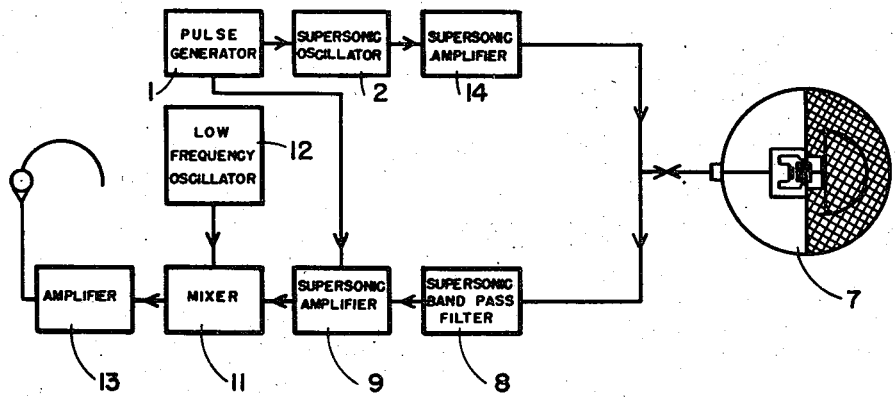
Figure 4 is a block diagram of a modification of the invention.

Figure 4 illustrates the same basic device in a simplified form intended for use by the blind. The measuring gate has been eliminated to reduce the size, weight, and cost of the unit. Reflected signals will produce tonal effects depending on the distance of the object, and the operator is trained to estimate distance on the basis of these tonal effects resulting from the small time variations existant between initiating and reflected pulses.

A connection from pulse generator 1 to amplifier 9 provides for placing a bias on the receiving supersonic amplifier during the operating cycle of the initiating generator. This serves to momentarily lower the amplification afforded by these stages so that the initiating pulse is of the same order of amplitude as returned pulses.

The particular type of transducer shown in Figures 1 and 4 is by way of example only and may be varied in size, construction and principle of operation to suit particular applications. In the transducer shown, 7, a dynamic type moving coil assembly is supported in an open faced parabola covered by a protective mesh screen. The diaphragm operated in piston like fashion by the moving coil is located near the focal point of the parabola and partially surrounded by a hemispherical shield.

It may prove desirable to use separate transducing devices for receiving and transmitting. Hence the illustrated device 7, which is intended for both the function of receiving and transmitting is only shown as a preferred embodiment and it should be understood that other types may be substituted within the scope of this invention.

The entire equipment could be constructionally engineered to occupy a small space and be worn over the shoulder by means of a strap, carried in a pocket or otherwise attached to the user. The use of "peanut" tubes, varistors to replace diodes, and small batteries would reduce the space requirements. The directional transducer and range indicator could be made of a size comparable to that of a common hand flashlight and would be used by the individual in that manner.

The invention described herein may be manufactured and used by or for the Government of the United States for governmental purposes without the payment of any royalty thereon or therefor.

What is claimed is:

1. A range finding system, comprising a pulse generator, means for transmitting pulses from said generator to an object, means for receiving reflected pulses therefrom, a first gate in said receiving means operated by pulses from said generator, a second gate and an aural signal means, said signal means comprising a low frequency oscillator and mixer for producing an audible signal when reflected pulses are passed by the second gate, a single pulse multivibrator rendered effective by said generator for controlling the operation of the second gate, manually adjustable means for varying the timing of said multivibrator to cause the second gate to open upon the simultaneous receipt of said reflected pulses, and touch perceptive means associated with the adjustable means for indicating the range of the object.

2. A range and direction finding system, comprising a pulse generator, a supersonic oscillator controlled thereby, means for transmitting pulses from said generator to an object, means for receiving reflected pulses therefrom, a first gate in said receiving means operated by pulses from said generator to render the receiving means ineffective when pulses are being transmitted, a second gate and an aural signal means, said signal means comprising a low frequency oscillator and mixer for producing an audible signal when reflected pulses are passed by the second gate, a single pulse multivibrator rendered effective by said generator for controlling the operation of the second gate, manually adjustable means for varying the timing of the multivibrator to cause the second gate to open upon the simultaneous receipt of said reflected pulses, touch perceptive means associated with the adjustable means for indicating the range of the object, and additional means for indicating the direction of the object.

3. A range finding system comprising a pulsing device, means for transmitting a pulse from said pulsing device to an object, means for receiving a reflected pulse therefrom, first and second gating devices, an aural signal means, means for passing said reflected pulse through said gating devices to said signal means thereby producing an audible signal, means for controlling said first gating device in response to said pulsing device, and a multivibrator responsive to said pulsing device for triggering said second gating device, said multivibrator being adjustable for varying the timing of said triggering so as to operate said second gating device simultaneously with the receipt of said reflected pulse, the setting of said adjustable multivibrator being indicative of the range of the object.

4. The combination of claim 3 wherein said range indicating device has touch perceptive code indications thereon.

5. A range finding system comprising a pulsing device, means for transmitting a pulse from said pulsing device to an object, means for receiving a reflected pulse therefrom, a variable gating means connected to the output of the receiving means, multivibrator means responsive to said pulsing means for triggering the gating means, means for obtaining an aural signal from said reflection when the gating means is triggered, means for manually adjusting said multivibrator to gate said reflection to the aural signal means, and touch perceptive means associated with the manual means for indicating the range of the object.

6. A range finding system comprising a pulsing device, means for transmitting a pulse from said pulsing device to an object, means for receiving a reflected pulse therefrom, a variable gating means, a multivibrator responsive to said pulsing device for triggering said gating means, said multivibrator being adjustable for varying the timing of said triggering so as to operate said gating device simultaneously with receipt of said reflected pulse, the setting of said adjustable multivibrator being indicative of the range of the object.

7. A range finding system comprising a pulsing device, means for transmitting a pulse from said pulsing device to an object, means for receiving a reflected pulse therefrom, a variable gating means connected to the output of the receiving means, an oscillator and mixer connected to the gating means, a multivibrator responsive to said pulsing device for triggering said gating means, said multivibrator being manually adjustable for varying the timing of said triggering so as to operate said gating means simultaneously with receipt of said reflected pulse, said reflected pulse passing through said mixer to produce an audible signal, and touch perceptive means associated with said manually adjustable multivibrator for indicating the range of the object.

ROBERT E. MILLER.

REFERENCES CITED

The following references are of record in the file of this patent:

UNITED STATES PATENTS

| Number | Name | Date |
|---|---|---|
| 299,968 | Toore | June 10, 1884 |
| 1,547,574 | Fay | July 28, 1925 |
| 1,562,950 | Fessenden | Nov. 24, 1925 |
| 1,724,576 | Grimes | Aug. 13, 1929 |
| 1,924,174 | Wolf | Aug. 29, 1933 |
| 2,012,837 | Tear | Aug. 27, 1935 |
| 2,083,344 | Newhouse | June 8, 1937 |
| 2,108,090 | Turner | Feb. 15, 1938 |
| 2,112,541 | Morton | Mar. 29, 1938 |
| 2,116,717 | Scharlaw | May 10, 1938 |
| 2,371,988 | Granquist | Mar. 20, 1945 |
| 2,403,527 | Hershberger | July 9, 1946 |
| 2,406,316 | Blumlein et al. | Aug. 27, 1946 |
| 2,407,198 | Wolff | Sept. 3, 1946 |
| 2,416,088 | Deerhake | Feb. 18, 1947 |
| 2,444,235 | Walker | June 29, 1948 |
| 2,446,937 | Lorance | Aug. 10, 1948 |
| 2,460,316 | Trent | Feb. 1, 1949 |

FOREIGN PATENTS

| Number | Country | Date |
|---|---|---|
| 552,072 | Great Britain | Mar. 22, 1943 |